(12) United States Patent
Ganesan et al.

(10) Patent No.: US 11,579,912 B2
(45) Date of Patent: Feb. 14, 2023

(54) INTEGRITY-PRESERVING COLD MIGRATION OF VIRTUAL MACHINES

(71) Applicant: EMC IP Holding Company LLC, Hopkinton, MA (US)

(72) Inventors: Vaideeswaran Ganesan, Bangalore (IN); Suren Kumar, Katpadi (IN); Vinod Durairaj, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 493 days.

(21) Appl. No.: 16/789,784

(22) Filed: Feb. 13, 2020

(65) Prior Publication Data
US 2021/0255883 A1 Aug. 19, 2021

(51) Int. Cl.
*G06F 9/455* (2018.01)
*G06F 16/11* (2019.01)

(52) U.S. Cl.
CPC ........ *G06F 9/45558* (2013.01); *G06F 16/128* (2019.01); *G06F 2009/4557* (2013.01)

(58) Field of Classification Search
CPC .............. G06F 9/45558; G06F 16/128; G06F 2009/4557
See application file for complete search history.

(56) References Cited

U.S. PATENT DOCUMENTS

| 9,996,381 | B1* | 6/2018 | Raju .................. G06F 9/45558 |
| 2013/0254339 | A1* | 9/2013 | Schilders ............... H04L 67/06 709/217 |
| 2014/0196037 | A1* | 7/2014 | Gopalan ............ G06F 12/1009 718/1 |
| 2016/0026489 | A1* | 1/2016 | Maislos ............. G06F 9/45558 718/1 |

(Continued)

OTHER PUBLICATIONS

U. Deshpande et al. ("Agile Live Migration of Virtual Machines," 2016 IEEE International Parallel and Distributed Processing Symposium (IPDPS), 2016, pp. 1061-1070, doi: 10.1109/IPDPS.2016.120 (Year: 2016).*

(Continued)

*Primary Examiner* — Lewis A Bullock, Jr.
*Assistant Examiner* — Kevin X Lu
(74) *Attorney, Agent, or Firm* — Ryan, Mason & Lewis, LLP

(57) ABSTRACT

A method includes identifying a source virtual machine to be migrated from a source domain to a target domain, extracting file-in-use metadata and shared asset metadata from virtual machine metadata of the source virtual machine, and copying one or more files identified in the file-in-use metadata to a target virtual machine in the target domain. For each of one or more shared assets identified in the shared asset metadata, the method further includes (a) determining whether or not the shared asset already exists in the target domain, (b) responsive to the shared asset already existing (Continued)

in the target domain, updating virtual machine metadata of the target virtual machine to specify the shared asset, and (c) responsive to the shared asset not already existing in the target domain, copying the shared asset to the target domain and updating virtual machine metadata of the target virtual machine to specify the shared asset.

20 Claims, 9 Drawing Sheets

(56) References Cited

U.S. PATENT DOCUMENTS

2017/0031710 A1* 2/2017 Kuik .................... G06F 3/064
2017/0264684 A1* 9/2017 Spillane .............. H04L 67/1095

OTHER PUBLICATIONS

Examiner Search result on "shared VMDK between virtual machines" (Year: 2022).*
Examiner Search result on "VM cow data disk shared" (Year: 2022).*
Examiner search result on "VMDK virtual disk image" (Year: 2022).*
Carmen Lopez, "What is the Difference Between a Hot Migration and a Cold Migration?" GMO Cloud America, https://support.gmocloud.us/hc/en-us/articles/230943528-What-is-the-difference-between-a-hot-migration-and-a-cold-migration-, Oct. 25, 2016, 1 page.
Sonali Desai, "VMware Cloud on AWS: Get Your Basics Right: Part 2: Cloud Migration," VMware, Inc., https://cloud.vmware.com/community/2019/03/27/vmware-cloud-aws-get-basics-right-part-2-cloud-migration/, Mar. 27, 2019, 6 pages.
Vladan Seget, "Migrate VMs with Snapshots—Yes, in vSphere 5," https://www.vladan.fr/migrate-vms-with-snapshots-yes-in-vsphere-5/, Feb. 9, 2013, 3 pages.
Margaret Rouse, "VMware DRS (Distributed Resource Scheduler)" https://searchvmware.techtarget.com/definition/VMware-DRS, May 2019, 7 pages.
Vmware, "Virtual Machine Migration," vSphere 5 Documentation Center, https://pubs.vmware.com/vsphere-50/index.jsp?topic=%2Fcom.vmware.wssdk.pg.doc_50%2FPG_Ch11_VM_Manage.13.2.html, Aug. 2011, 2 pages.
Ankit Bisht, "Preemptive and Non-Preemptive Scheduling," GeeksforGeeks, https://www.geeksforgeeks.org/preemptive-and-non-preemptive-scheduling/, 2019, 6 pages.
Eric Siebert, "Understand VMware Virtual Machine Files," TechTarget, Mar. 25, 2019, 4 pages.

* cited by examiner

| File-in-Use | |
|---|---|
| Data/File format | Data Description |
| .nvram | The NVRAM file, which stores the state of the virtual machine BIOS |
| .vmem | The virtual machine paging file, which backs up the guest main memory on the host file system. This file exists only when the virtual machine is running or if the virtual machine fails |
| -flat.vmdk | Virtual machine data disk |
| .vswp | Virtual machine swap file |
| .vmx | vmname.vmx- The primary configuration file, which stores virtual machine settings. If the virtual machine was created with an earlier version of Workstation on a Linux host, this file might have a .cfg extension. |

FIG. 4A

| Moveable file | |
|---|---|
| .vmss | The suspended state file, which stores the state of a suspended virtual machine |
| .vmsd | Virtual machine snapshots |
| .log | Log files (e.g., old log files) |
| .vmsn | The snapshot state file, which stores the running state of a virtual machine at the time a corresponding snapshot is taken |

FIG. 4B

| Shared Asset | |
|---|---|
| .iso | ISO image for format |
| .img | .img image for format |
| .DSK | Disk Image |
| .HDI | Hard Disk Image |
| .IMA | Disk Image |

FIG. 4C

| Migration job | Data in GB | Method | Total VM Downtime |
|---|---|---|---|
| Without solution | 1080 GB | • VM Shutdown<br>• Copy the files - 1080 GB<br>• Start the VM | 1 hour |
| Without solution (no migrating of shared assets) | 1080 GB + 300 GB | • VM Shutdown<br>• Copy the files - 1080 GB<br>• Start the VM<br>• Shared assets will not be copied | 1 hour |
| With solution | 1080 GB | • VM Shutdown<br>• Move ~360 GB (files-in-use)<br>• Start the VM<br>• Move ~720 GB (movable files) while VM is starting up | 20 minutes |
| With solution (migrating shared assets) | 1080 GB + 300 GB | • VM Shutdown<br>• Move ~360 GB (files-in-use)<br>• Parallel Move ~300 GB (shared assets)<br>• Start the VM<br>• Move ~720 GB (movable files) while VM is starting up | 20 minutes |

FIG. 5

INTEGRITY-PRESERVING COLD MIGRATION OF VIRTUAL MACHINES

FIELD

The field relates generally to information processing systems, and more particularly to virtualization infrastructure in information processing systems.

BACKGROUND

Various techniques are known in the art for migration of virtual machines deployed within virtualization infrastructure. These include so-called "live" migration techniques, also referred to as "hot" migration techniques, which are generally performed without interrupting the operation of the virtual machine, and so-called "cold" migration techniques, in which a virtual machine is typically shut down or otherwise interrupted in conjunction with the migration. Live migration typically requires that all of the virtual machine assets are in shared storage of a single management domain. Accordingly, there are many virtual machine migration use cases that cannot utilize live migration, and therefore instead utilize cold migration. Unfortunately, conventional cold migration techniques exhibit a number of significant drawbacks. For example, it can be difficult to ensure migrated virtual machine integrity, particularly with regard to shared assets of the virtual machine as well as other types of assets that may be used by the virtual machine in operation but are not readily apparent at the time of the migration. Moreover, manual intervention is typically required, leading to excessive amounts of virtual machine downtime.

SUMMARY

Illustrative embodiments provide techniques for integrity-preserving cold migration of virtual machines in information processing systems. For example, some embodiments are configured to facilitate cold migration of virtual machines in a manner that advantageously preserves virtual machine integrity across shared assets while also providing significantly reduced virtual machine downtime.

In one embodiment, an apparatus comprises at least one processing platform that includes a plurality of processing devices each comprising a processor coupled to a memory. The at least one processing platform identifies a source virtual machine to be migrated from a source domain to a target domain, and extracts file-in-use metadata and shared asset metadata from virtual machine metadata of the source virtual machine.

The at least one processing platform copies one or more files identified in the file-in-use metadata to a target virtual machine in the target domain. For each of one or more shared assets identified in the shared asset metadata, the at least one processing platform (a) determines whether or not the shared asset already exists in the target domain, (b) responsive to the shared asset already existing in the target domain, updates virtual machine metadata of the target virtual machine to specify the shared asset, and (c) responsive to the shared asset not already existing in the target domain, copies the shared asset to the target domain and updates virtual machine metadata of the target virtual machine to specify the shared asset.

In another embodiment, a method includes identifying a source virtual machine to be migrated from a source domain to a target domain, extracting file-in-use metadata and shared asset metadata from virtual machine metadata of the source virtual machine, and copying one or more files identified in the file-in-use metadata to a target virtual machine in the target domain. For each of one or more shared assets identified in the shared asset metadata, the method further includes (a) determining whether or not the shared asset already exists in the target domain, (b) responsive to the shared asset already existing in the target domain, updating virtual machine metadata of the target virtual machine to specify the shared asset, and (c) responsive to the shared asset not already existing in the target domain, copying the shared asset to the target domain and updating virtual machine metadata of the target virtual machine to specify the shared asset.

In conjunction with a cold migration process as disclosed herein, additional operations are performed in some embodiments. For example, the source virtual machine is illustratively shut down in the source domain prior to or otherwise in conjunction with extracting file-in-use metadata and shared asset metadata from virtual machine metadata of the source virtual machine, and the target virtual machine is started in the target domain after or otherwise in conjunction with completion of the copying and updating operations.

The source domain and the target domain may both be part of the same processing platform. For example, the source domain and the target domain may comprise different virtual machine management domains in the same data center. Alternatively, the source domain and the target domain may be in different processing platforms, such as within respective first and second data centers. Numerous other arrangements of source and target domains are possible in other embodiments.

The file-in-use metadata illustratively comprises a list of files in the source virtual machine that are required for operation of the source virtual machine. In conjunction with successful completion of the copying of each of the one or more files identified in the file-in-use metadata to the target virtual machine in the target domain, a completion extension is illustratively added to the successfully copied file in the source domain.

The one or more shared assets identified in the shared asset metadata illustratively comprise one or more assets each assigned to multiple virtual machines of the source domain.

In some embodiments, the copying of one or more files identified in the file-in-use metadata and the copying of the shared assets to the target domain are performed at least in part in parallel with one another.

Additionally or alternatively, for each of the one or more shared assets identified in the shared asset metadata, an asset migration metadata file is updated in the target domain to include that shared asset.

In determining whether or not a shared asset already exists in the target domain, the processing platform illustratively accesses an asset migration metadata file maintained in the target domain, and determines whether or not the shared asset is identified in the asset migration metadata file.

In addition to the above-noted file-in-use metadata and shared asset metadata, the processing platform in some embodiments also extracts movable file metadata from the virtual machine metadata of the source virtual machine, and copies one or more files identified in the movable file metadata to the target virtual machine in the target domain. The copying of the one or more files identified in the movable file metadata to the target virtual machine in the target domain is illustratively performed after the target virtual machine is started in the target domain, although other arrangements are possible.

The movable file metadata illustratively comprises a list of files in the source virtual machine that can be moved without impacting operation of the source virtual machine. For example, the one or more files identified in the movable file metadata can comprise a suspended state file, a virtual machine snapshot file, a log file and/or a snapshot state file. In conjunction with successful completion of the copying of each of the one or more files identified in the movable file metadata to the target virtual machine in the target domain, a completion extension is illustratively added to the successfully copied file in the source domain.

These and other illustrative embodiments include, without limitation, apparatus, systems, methods and computer program products comprising processor-readable storage media.

BRIEF DESCRIPTION OF THE DRAWINGS

FIGS. 4A, 4B and 4C, collectively referred to as FIG. 4, show more detailed examples of files and images characterized by the fields of virtual machine metadata of FIG. 3.

FIG. 5 illustrates example cold migration scenarios in one embodiment, showing downtime reduction relative to conventional arrangements.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
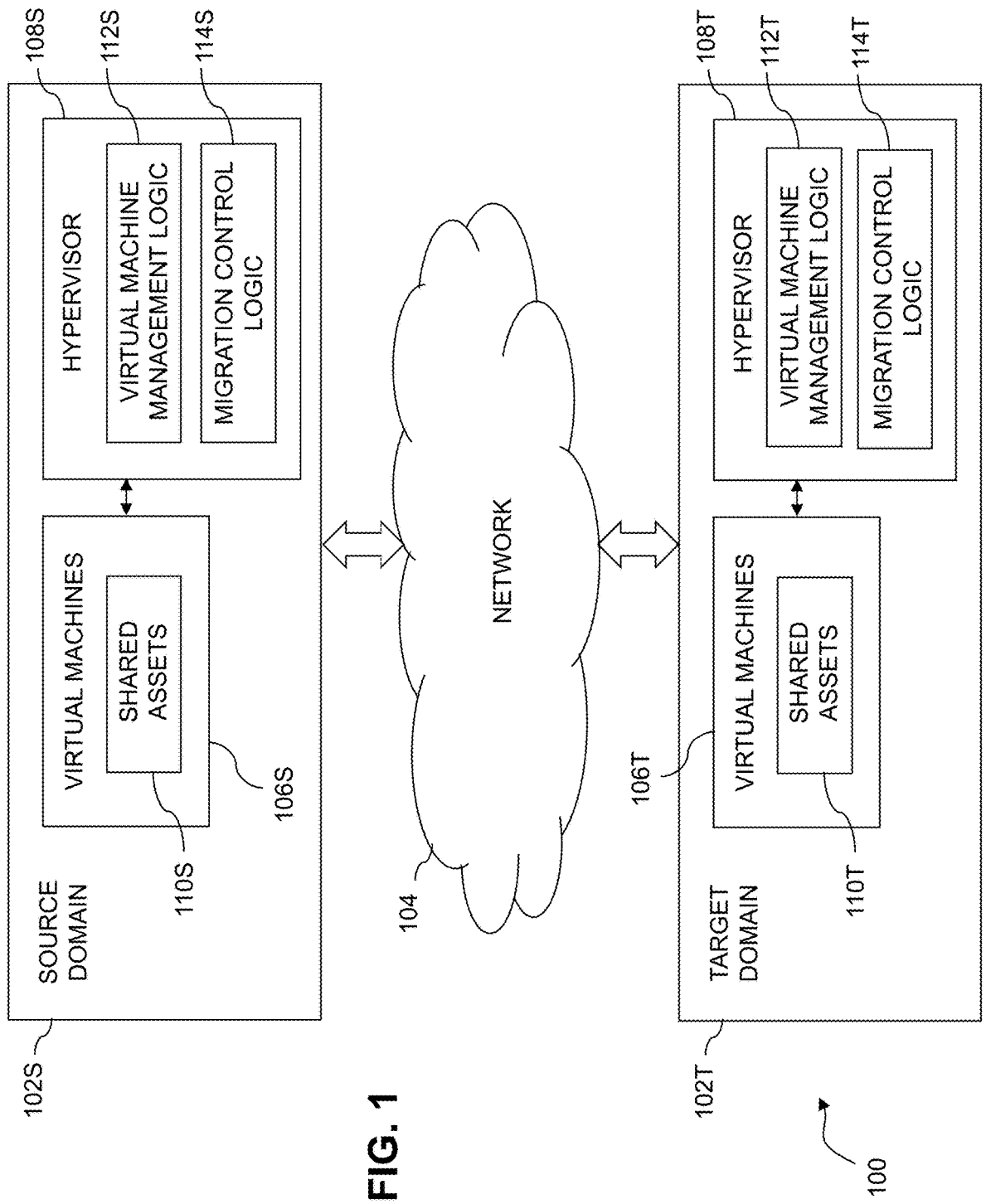
FIG. 1 is a block diagram of an information processing system configured with functionality for integrity-preserving cold migration of virtual machines between source and target domains in in an illustrative embodiment.

FIG. 1 shows an information processing system 100 configured in accordance with an illustrative embodiment. The information processing system 100 comprises a source domain 102S and a target domain 102T, collectively domains 102, which are configured to communicate with one another over a network 104. The source and target domains 102 are more particularly configured in this embodiment to participate in an integrity-preserving cold migration process in which one or more virtual machines are migrated from the source domain 102S into the target domain 102T.

The domains 102 in the FIG. 1 embodiment are assumed to be implemented using at least one processing platform, with each such processing platform comprising one or more processing devices, and each such processing device comprising a processor coupled to a memory. Such processing devices can illustratively include particular arrangements of compute, storage and network resources. Such resources illustratively comprise one or more host devices and one or more associated storage systems.

The host devices of a given one of the domains 102 illustratively comprise servers or other types of computers of an enterprise computer system, a cloud-based computer system or other arrangement of compute nodes. The host devices in some embodiments illustratively provide compute services such as execution of one or more applications on behalf of each of one or more system users. The applications illustratively involve writing data to and reading data from the one or more associated storage systems.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The domains 102 in some embodiments are part of the same processing platform, and in other embodiments are part of respective distinct processing platforms. For example, the domains 102 can represent respective different parts of a given data center, or can represent respective different data centers.

Accordingly, distributed implementations of the system 100 are possible, in which certain components of the system 100 reside in one data center in a first geographic location while other components of the system reside in one or more other data centers in one or more other geographic locations that are potentially remote from the first geographic location.

The domains 102 can additionally or alternatively be part of cloud infrastructure such as an Amazon Web Services (AWS) system. Other examples of cloud-based systems that can be used to provide at least portions of the domains 102 include Google Cloud Platform (GCP) and Microsoft Azure.

A wide variety of other arrangements involving one or more processing platforms are possible. The term "processing platform" as used herein is therefore intended to be broadly construed so as to encompass, by way of illustration and without limitation, multiple sets of processing devices that are configured to communicate over one or more networks. Additional examples of processing platforms utilized to implement domains 102 in illustrative embodiments will be described in more detail below in conjunction with FIGS. 6 and 7.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The source domain 102S comprises a plurality of virtual machines 106S and an associated hypervisor 108S. The virtual machines 106S comprise shared assets 110S as well as other types of assets that are not shared. Such shared and non-shared assets illustratively include particular arrangements of compute, storage and network resources. For example, a given one of the virtual machines 106S illustratively comprises a designated combination of compute, storage and network resources, such as a set of one or more virtual central processing units (CPUs), one or more virtual storage drives and one or more virtual network interface cards (NICs). Other types and configurations of virtual machines can be used in other embodiments, and the term "virtual machine" as used herein is intended to be broadly construed.

Similarly, the target domain 102T comprises a plurality of virtual machines 106T and an associated hypervisor 108T. The virtual machines 106T comprise shared assets 110T as well as other types of assets that are not shared. Such shared and non-shared assets illustratively include particular arrangements of the above-noted compute, storage and network resources.

The virtual machines 106S and 106T are collectively referred to herein as virtual machines 106. Hypervisors 108S and 108T are likewise collectively referred to as hypervisors 108, and shared assets 110S and 110T are collectively referred to as shared assets 110.

The compute resources utilized by virtual machines 106 illustratively comprise portions of sets of processing cores and associated electronic memory components. For example, in a distributed arrangement comprising multiple nodes, each such node can comprise a separate set of processing cores and associated electronic memory components, different portions of which are allocated to different ones of the virtual machines 106 by its corresponding one of the hypervisors 108. An example of a hypervisor platform that may be used to implement hypervisors 108 within the system 100 is VMware® vSphere® which may have an associated virtual infrastructure management system such as the VMware® vCenter™. The underlying physical machines may comprise one or more distributed processing platforms that each include multiple physical processing devices each comprising at least one processor coupled to a memory. Numerous other arrangements of compute resources are possible.

The storage resources utilized by virtual machines 106 illustratively comprise portions of one or more storage systems, such as one or more VNX®, VMAX®, Unity™ or PowerMax™ storage arrays from Dell EMC of Hopkinton, Mass. A wide variety of other types of storage systems can be used in implementing the domains 102 in other embodiments, including, by way of example, a distributed content addressable storage (CAS) system such as an XtremIO™ CAS system from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The storage devices of such storage systems illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

Storage systems in some embodiments can utilize command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

However, it is to be appreciated that other types of storage devices can be used in other embodiments. For example, a given storage system can include a combination of different types of storage devices, as in the case of a multi-tier storage system comprising an NVM-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. The term "storage system" as used herein is also intended to be broadly construed, and should not be viewed as being limited to any particular type or configuration of storage system.

Different portions of storage resources of the type described above are allocated to different ones of the virtual machines 106 by its corresponding one of the hypervisors 108. For example, each of the virtual machines 106 is illustratively allocated a set of logical storage volumes each corresponding to a different logical unit (LUN). Numerous other arrangements of storage resources are possible.

The network resources utilized by virtual machines 106 illustratively comprise portions of one or more sets of network interfaces, possibly of different types supporting respective different communication protocols within system 100. For example, in a distributed arrangement comprising multiple nodes, each such node can comprise a separate set of NICs or other types of network interfaces, different portions of which are allocated to different ones of the virtual machines 106 by its corresponding one of the hypervisors 108. Numerous other arrangements of network resources are possible.

The hypervisor 108S of source domain 102S in the FIG. 1 embodiment includes virtual machine management logic 112S and migration control logic 114S. Similarly, the hypervisor 108T of target domain 102T includes virtual machine management logic 112T and migration control logic 114T.

The instances of virtual machine management logic 112S and 112T are collectively referred to herein as virtual machine management logic 112, and provide functionality such as creating, configuring, running, monitoring, breaking down and otherwise managing their respective corresponding sets of virtual machines 106.

The instances of migration control logic 114S and 114T are collectively referred to herein as migration control logic 114. The migration control logic 114 illustratively comprises at least a portion of a "migration engine" of the system 100, configured to implement a cold migration process carried out between the domains 102, such as the cold migration process to be described below in conjunction with the flow diagram of FIG. 2.

The cold migration process can be initiated from another process of a different type, such as a virtual machine management process carried out by at least one of the instances of virtual machine management logic 112 in at least one of the hypervisors 108 of the domains 102.

A given virtual machine subject to cold migration from the source domain 102S to the target domain 102T can comprise one or more of the virtual machines 106S. Different migration processes of different types can be implemented for different virtual machines in the set of virtual machines 106S.

The hypervisors 108 of the domains 102 may include additional modules and other components typically found in conventional implementations of such hypervisors, although such additional modules and other components are omitted from the figure for clarity and simplicity of illustration.

For example, in some embodiments, the hypervisors 108 comprise respective otherwise conventional hypervisors suitably modified to incorporate migration control logic 114 for carrying out integrity-preserving cold migration as disclosed herein. Such hypervisors can illustratively include, for example, VMwarex ESXi hypervisors, Microsoft Hyper-V hypervisors, kernel-based virtual machine (KVM) hypervisors, Xen hypervisors, and other types of hypervisors. The term "hypervisor" as used herein is therefore intended to be broadly construed.

It will be assumed for the following description of the FIG. 1 embodiment that there is an existing relationship between the source domain 102S and the target domain 102T in the system 100. For example, the domains 102 may represent respective different portions of a common data center or other processing platform of an enterprise, a cloud service provider or other entity. As another example, the domains 102 may represent respective different data centers or other processing platforms of an enterprise, a cloud service provider or other entity, such as a production data center and a recovery data center.

An exemplary cold migration process more particularly comprises a migration process in which at least one of the virtual machines in the set of virtual machines 106S is migrated from the source domain 102S to the target domain 102T so as to become part of the set of virtual machines 106T. Other types of migration arrangements, each possibly involving more than one virtual machine, can be used in other embodiments.

As indicated above, the system 100 is illustratively configured to provide what is referred to herein as "integrity-preserving cold migration of virtual machines." For example, such integrity-preserving cold migration of virtual machines is illustratively performed as part of a migration process carried out between the source domain 102S and the target domain 102T. These and other operations related to integrity-preserving cold migration of virtual machines as disclosed herein are illustratively implemented at least in part by or otherwise under the control of the source and target instances of migration control logic 114. One or more such operations can be additionally or alternatively controlled by one or more other system components in other embodiments.

As indicated above, live or hot migration typically requires that all of the virtual machine assets are in shared storage of a single management domain. Such virtual machine assets illustratively include, for example, virtual machine metadata, virtual machine data files, virtual machine snapshot files, virtual machine "disks" or other drives, etc. If all such assets are in a shared virtual machine file system or other shared storage arrangement, live migration is possible and as a result there is no requirement that cold migration be used. However, there are many virtual machine migration use cases that cannot utilize live migration, and therefore instead must utilize cold migration.

For example, cold migration is usually performed when a virtual machine has to be migrated from one management domain to another. Different types of virtual machine installations may have different types of management domains. In the case of a VMware® vCenter™ managing ESXi hypervisors, a management domain in some embodiments may comprise a data center, while in the case of a Microsoft System Center Virtual Machine Manager (SCVMM) managing Microsoft Hyper-V hypervisors, the management domain may comprise a host group. These are examples of domains 102 in some embodiments, and additional or alternative domains 102 can be used in these and other embodiments.

Migration of virtual machines between source and target domains 102 in other embodiments may comprise, for example, migration of a virtual machine from one virtual switch to another, migration of a virtual machine from an on-premises cloud to a public cloud or vice versa, and numerous other arrangements. Terms such as "source domain" and "target domain" as used herein are therefore intended to be broadly construed.

In some conventional arrangements, there is no provision for shared assets to be identified as such during cold migration, leading to various inefficiencies. For example, one or more of these conventional arrangements may only migrate virtual machine metadata and snapshot files, while not migrating other related assets such as data drives and ISO images. Conventional implementations of VMware® vCenter™ may suppress the lack of these related assets in conjunction with cold migration, such that their absence is discoverable only after the migrated virtual machine again becomes functional.

For these and other reasons, it can be difficult to ensure migrated virtual machine integrity, particularly with regard to shared assets of the virtual machine as well as other types of assets that may be used by the virtual machine in operation but are not readily apparent at the time of the migration. Moreover, manual intervention is typically required, leading to excessive amounts of virtual machine downtime. Cold migrations are therefore conventionally a planned activity involving manual intervention of system administrators, and as a result may be restricted in many cases to a predetermined maintenance window.

Illustrative embodiments overcome these and other disadvantages of conventional practice by providing techniques for integrity-preserving cold migration of virtual machines in information processing systems such as system 100. For example, some embodiments are configured to facilitate cold migration of virtual machines in a manner that advantageously preserves virtual machine integrity across shared assets while also providing significantly reduced virtual machine downtime.

Figure 3:
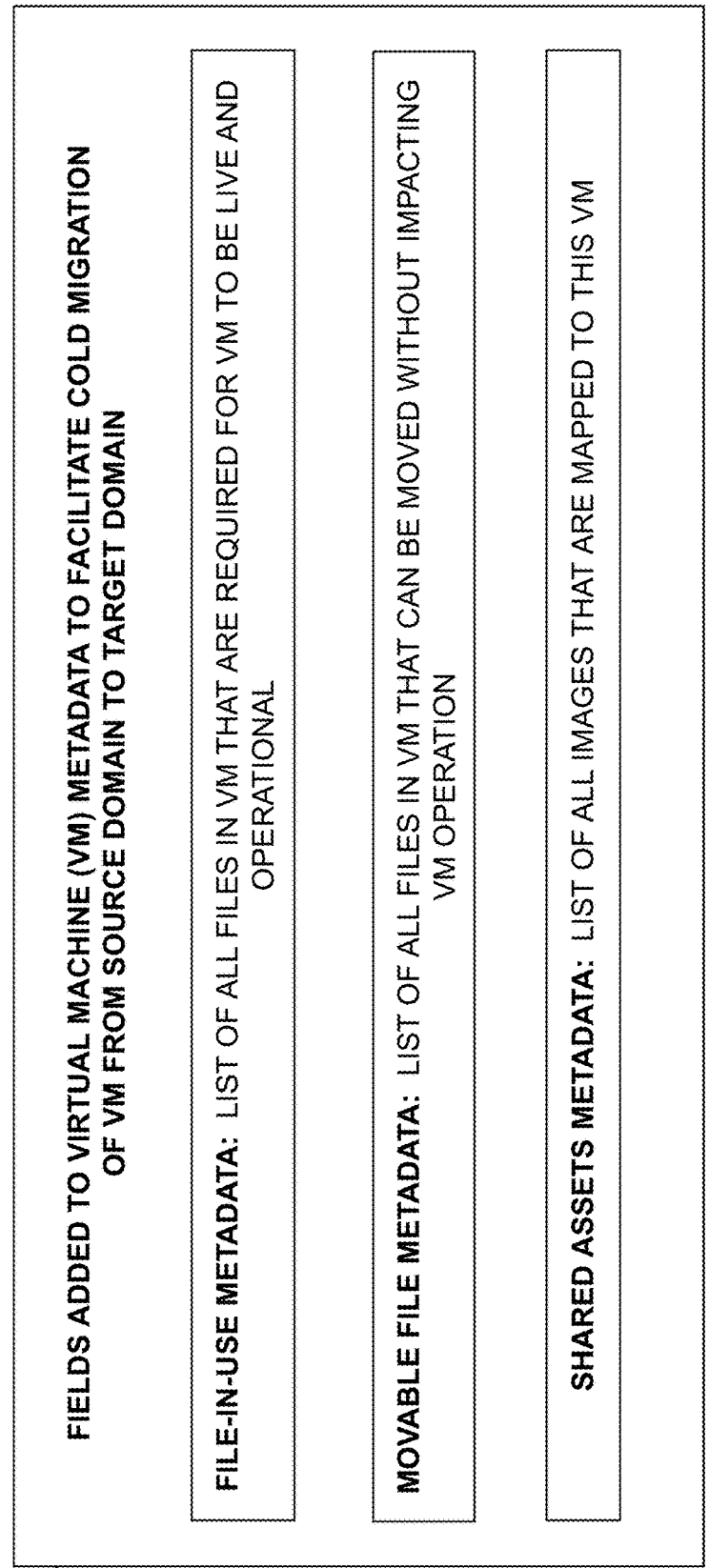
FIG. 3 shows fields added to virtual machine metadata to facilitate cold migration between source and target domains in an illustrative embodiment.

As will be described in more detail below, this illustratively involves enhancing the virtual machine metadata with one or more additional fields that facilitate cold migration of virtual machines from a source domain to a target domain. Such fields in some embodiments include additional fields for file-in-use metadata, moveable file metadata and shared assets metadata, examples of which are shown in FIGS. 3 and 4.

In accordance with the functionality for integrity-preserving cold migration of virtual machines, the system 100 is configured to identify a source virtual machine to be migrated from the source domain 102S to target domain 102T, to extract file-in-use metadata and shared asset metadata from virtual machine metadata of the source virtual machine, and to copy one or more files identified in the file-in-use metadata to a target virtual machine in the target domain 102T. For each of one or more shared assets identified in the shared asset metadata, the system 100 is further configured to determine whether or not the shared asset already exists in the target domain 102T. Responsive to the shared asset already existing in the target domain 102T, the system 100 updates virtual machine metadata of the target virtual machine to specify the shared asset, and responsive to the shared asset not already existing in the target domain 102T, the system 100 copies the shared asset to the target domain 102T and updates virtual machine metadata of the target virtual machine to specify the shared asset.

The file-in-use metadata illustratively comprises a list of files in the source virtual machine that are required for operation of the source virtual machine.

In some embodiments, in conjunction with successful completion of the copying of each of the one or more files identified in the file-in-use metadata to the target virtual machine in the target domain 102T, a completion extension is added to the successfully copied file in the source domain 102S. For example, a completion extension such as ".phase1_complete" may be added to the successfully copied file of the source virtual machine. If copying of one or more other files identified in the file-in-use metadata were to fail, the migration operation may be aborted and the previously-added extensions removed.

The one or more shared assets identified in the shared asset metadata illustratively comprise one or more assets each assigned to multiple ones of the virtual machines 106S of the source domain 102S. Such shared assets represent at least a portion of the shared assets 110S of the virtual machines 106S.

For each of the one or more shared assets identified in the shared asset metadata, an asset migration metadata (AMM) file is illustratively updated in the target domain 102T to include that shared asset.

The system 100 is illustratively further configured to extract movable file metadata from the virtual machine metadata of the source virtual machine, and to copy one or more files identified in the movable file metadata to the target virtual machine in the target domain 102T. The copying of the one or more files identified in the movable file metadata to the target virtual machine in the target domain 102T is illustratively performed after the target virtual machine is started in the target domain 102T.

The movable file metadata comprises, for example, a list of files in the source virtual machine that can be moved without impacting operation of the source virtual machine. Such files may more particularly include a suspended state file, a virtual machine snapshot file, a log file and/or a snapshot state file.

In some embodiments, in conjunction with successful completion of the copying of each of the one or more files identified in the movable file metadata to the target virtual machine in the target domain 102T, a completion extension is added to the successfully copied file in the source domain 102S. For example, a completion extension such as ".phase2_complete" may be added to the successfully copied file of the source virtual machine. If copying of one or more other files identified in the moveable file metadata were to fail, the migration operation may be aborted and the previously-added extensions removed.

Additional examples of the above-noted file-in-use metadata, shared assets metadata and moveable file metadata will be described below in conjunction with FIGS. 3 and 4.

In some embodiments, the copying of one or more files identified in the file-in-use metadata and the copying of the shared asset to the target domain 102T are performed at least in part in parallel with one another.

In some embodiments, the system 100 in determining whether or not a given one of the shared assets already exists in the target domain 102T more particularly accesses the above-noted AMM file maintained in the target domain 102T, and determines whether or not the shared asset is identified in the AMM file. If the shared asset is identified in the AMM file, it is affirmatively determined that the shared asset exists in the target domain 102T.

After all files, images or other assets have been successfully copied from the source domain 102S to the target domain 102T, any files in the source domain having the above-noted ".phase*_complete" extensions may be deleted.

At least portions of the above-described operations carried out in conjunction with a process for integrity-preserving cold migration of virtual machines are illustratively performed at least in part by or under the control of a migration engine comprising the migration control logic 114, and operating in cooperation with the virtual machine management logic 112. Additional or alternative operations may be used in such a process in other embodiments. Also, the ordering of the operations can be varied, and different portions of the process can be performed at least in part in parallel with one another.

More detailed illustrations of example processes for integrity-preserving cold migration of virtual machines for other embodiments implementing at least some of the above-described operations will be described below, including the example process presented in the flow diagram of FIG. 2.

It should be noted that the above-noted functionality for integrity-preserving cold migration of virtual machines described with reference to source domain 102S relative to target domain 102T can additionally or alternatively be implemented in target domain 102T relative to source domain 102S. The source and target domains 102 in some embodiments therefore both implement substantially the same functionality for integrity-preserving cold migration of virtual machines via their respective instances of migration control logic 114. Accordingly, designation of a particular one of the domains 102 as the "source" and the other as the "target" can be reversed in other embodiments.

It is to be appreciated that the above-described features and functionality of illustrative embodiments are presented by way of example only, and should not be construed as limiting in any way.

Accordingly, different numbers, types and arrangements of system components, such as domains 102, network 104, virtual machines 106, hypervisors 108, shared assets 110, virtual machine management logic 112 and migration control logic 114, including associated host devices and storage systems used to provide resources for the virtual machines 106, can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, and the additional diagrams of FIGS. 3 and 4.

Figure 2:
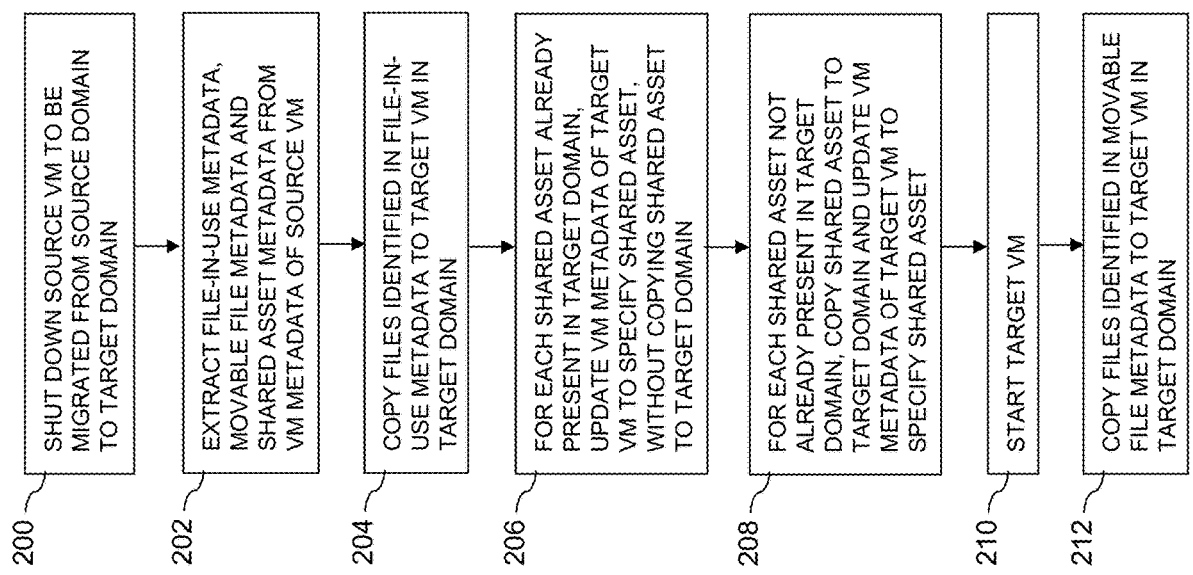
FIG. 2 is a flow diagram of a process for integrity-preserving cold migration of virtual machines between source and target domains in an illustrative embodiment.

The process as shown in FIG. 2 illustratively includes steps 200 through 212, and is suitable for use in the system 100 but is more generally applicable to other types of systems comprising source and target domains. The source and target domains 102 in this embodiment are assumed to comprise respective hypervisors 108 and respective sets of virtual machines 106 managed by those hypervisors 108, although other arrangements of source and target domains are possible in other embodiments.

The steps of the FIG. 2 process are illustratively performed primarily by or under the control of the hypervisors 108 and their respective instances of virtual machine management logic 112 and migration control logic 114 in the respective source and target domains 102 of system 100. Other system components can perform at least portions of one or more of these steps in other embodiments. The process as illustrated more particularly involves migrating a given one of the virtual machines 106S from the source domain 102S to the target domain 102T. The given source virtual machine subject to the migration process is referred to in the figure as the "source VM" and the corresponding target virtual machine of target domain 102T is referred to in the figure as the "target VM."

The source VM is characterized in source domain 102S by a corresponding set of VM metadata. Similarly, the target VM is characterized in target domain 102T by a corresponding set of VM metadata.

In step 200, the source VM is shut down to be migrated from the source domain 102S to the target domain 102T.

In step 202, file-in-use metadata, movable file metadata and shared asset metadata are extracted from VM metadata of the source VM. In other embodiments, these different types of metadata can each be extracted at different points in the process. For example, each different type of metadata can be extracted on an as-needed basis.

With reference now to FIG. 3, an example of a portion 300 of the VM metadata of the source VM is shown. In this example, the portion 300 of the VM metadata is more particularly configured to include a number of additional fields that are not typically part of such VM metadata. These fields are illustratively added to the VM metadata in accordance with the techniques disclosed herein, so as to facilitate cold migration of the source VM from the source domain 102S to the target domain 102T.

The added fields include file-in-use metadata, moveable file metadata and shared assets metadata. Such fields are illustratively added to the VM metadata of the source VM by the corresponding hypervisor 108S, which as indicated previously herein may comprise, for example, an ESXi hypervisor, a Hyper-V hypervisor, a KVM hypervisor, a Xen hypervisor, or another type of hypervisor, suitably modified to support the disclosed functionality. Accordingly, the term "hypervisor" as used herein is intended to be broadly construed. It is to be appreciated that different types and arrangements of metadata fields may be used with different types of hypervisors.

The file-in-use metadata in this embodiment includes a list of all files in the source VM that are required for the source VM to be live and operational. These files are also referred to in some embodiments as "unmovable" files. An example list of such files is shown in FIG. 4A, and illustratively includes one or more of the following files, although it is to be appreciated that only a subset of these files may actually be present in the file-in-use metadata at the time of the extraction in step 202:

1. A non-volatile RAM (NVRAM) file which stores the state of the basic input/output system (BIOS) of the source VM. This file has a .nvram extension.

2. A virtual machine paging file, which backs up the guest main memory on the host file system. This file typically exists only when the source VM is running or if the source VM has been subject to a failure, and has a .vmem extension.

3. A virtual machine data disk. These and other references herein to "disks" should not be construed as requiring the use of rotational storage media. This file has a -flat.vmdk extension.

4. A virtual machine swap file. This file has a .vswp extension.

5. The primary configuration file, which stores the virtual machine settings for the source VM. Although the file extension for this file is shown in the figure as .vmx, other extensions are possible. For example, if the source VM was created with an earlier version of VMware® Workstation on a Linux host, this file might instead have a .cfg extension.

The moveable file metadata illustratively includes a list of all files in the source VM that can be moved without impacting the operation of the source VM. Such moveable files illustratively include, among other files, one or more snapshot files each providing one or more snapshots of the source VM. An example list of moveable files is shown in FIG. 4B, and illustratively includes one or more of the following files, although it is again to be appreciated that only a subset of these files may actually be present in the moveable file metadata at the time of the extraction in step 202:

1. A suspended state file, which stores the state of a suspended VM. This file has a .vmss extension.

2. A virtual machine snapshot file, which stores one or more virtual machine snapshots. This file has a .vmsd extension.

3. A log file, illustratively storing one or more log files, possibly including "old" log files. This file has a .log extension.

4. A snapshot state file, which stores the running state of the virtual machine at the time a corresponding snapshot is taken. This file has a .vmsn extension.

The shared assets metadata in this embodiment includes a list of all images that are mapped to the source VM, where the term "image" is intended to be broadly construed, and may comprise ISO images and various virtual disk images. An example list of such images is shown in FIG. 4C, and illustratively includes one or more of the following images, although it is once again to be appreciated that only a subset of these images may actually be present in the shared assets metadata at the time of the extraction in step 202:

1. An ISO image for format, with .iso extension.
2. Another image for format, with .img extension.
3. A disk image, with .DSK extension.
4. A hard disk image, with .HDI extension.
5. A disk image, with .IMA extension.

The particular files, images, extensions and other aspects of the file-in-use metadata, moveable file metadata and shared assets metadata as described above and illustrated in FIGS. 3 and 4 are only examples, and alternative arrangements of VM metadata can be used in other embodiments. For example, different types of files, images and extensions may be used for different types of virtual machines managed by different types of hypervisors.

Returning now to FIG. 2, the remaining steps 204 through 212 of the process will be described.

In step 204, files identified in the file-in-use metadata extracted in step 202 are copied to the target VM in the target domain 102T.

In step 206, for each shared asset identified in the shared asset metadata extracted in step 202 that is already present in the target domain 102T, the VM metadata of the target VM is updated to specify the shared asset, without copying the shared asset to the target domain 102T. This advantageously ensures that shared assets are not unnecessarily duplicated in conjunction with migration of multiple virtual machines, even if those virtual machines are migrated at different times.

In step 208, for each shared asset identified in the shared asset metadata extracted in step 202 that is not already present in the target domain 102T, the shared asset is copied to the target domain 102T and the VM metadata of the target VM is updated to specify the shared asset.

In step 210, the target VM is started in the target domain 102T.

In step 212, the files identified in the movable file metadata extracted in step 202 are copied to the target VM in the target domain 102T.

Although not explicitly indicated in the figure, the process of FIG. 2 after completion of step 212 can return to step 200 in order to initiate migration of another virtual machine from the source domain 102S to the target domain 102T. Additionally or alternatively, different instances of the FIG. 2 process can execute at least in part in parallel with one another for different migration sessions each involving migration of one or more virtual machines from the source domain 102S to the target domain 102T.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving migration of virtual machines from a source domain to a target domain. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different virtual machine migration arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As indicated previously, in some embodiments, shared assets may be identified at least in part using an asset migration metadata (AMM) file. Numerous other types and arrangements of metadata can be used in illustrative embodiments.

An additional example of a process implemented at least in part by the migration control logic 114 of hypervisors 108 utilizing an AMM file includes the following steps:

1. Shut down the source VM.
2. Extract file-in-use metadata from the VM metadata of the source VM, and copy these files to the target VM. As each file identified in the file-in-use list is successfully copied to the target VM, add a completion extension ".phase1_complete" to the file in the source domain. If at any time, one of the file copies fails, abort the operation and remove any previously-added completion extensions.
3. If there are shared assets to be migrated, perform the following steps, illustratively at least in part in parallel with Step 2, for each such shared asset:
   (a) Create an AMM for the target VM if such an AMM is not already present. The AMM is therefore created in conjunction with performance of this step for the first one of the shared assets to be migrated, and then that same AMM is used for the other shared assets to be migrated.
   (b) If the asset does not exist in the target domain, then copy the asset to the target domain, and update the AMM for the target VM to include an entry comprising: an identifier of the source domain, a source file path for the asset in the source domain, a globally unique identifier (GUID) of the asset in the source domain, a target file path for the asset in the target domain, a GUID of the asset in the target domain, a file size for the asset, and a file hash and/or checksum for the asset generated using a message-digest algorithm such as MD5 or a secure hashing algorithm (SHA) such as SHA1.
   (c) If the asset already exists in the target system, do not copy the asset, but instead update the VM metadata of the target VM with a reference to at least the target file path in the target domain.
   (d) If at any time, the file copy for a shared asset fails, the operation is aborted and a corresponding status is provided to an administrator or other user.
4. Start the target VM.
5. Copy all the files identified by the moveable file metadata of the source VM to the target VM. Such moveable file metadata can be extracted in conjunction with performance of Step 2 above. As each file identified in the moveable file metadata is successfully copied to the target VM, add a completion extension ".phase2_complete" to the file in the source domain. If at any time, one of the file copies fails, abort the operation and remove any previously-added completion extensions.

6. Once all files have been copied, delete all the files with ".phase*_complete" extensions in the source domain.

7. For each of the shared assets, delete the shared asset in the source domain only if there are no remaining virtual machines in the source domain that reference that shared asset.

Again, it is to be appreciated that the above process, like the process of FIG. 2, is presented by way of illustrative example only. Additional or alternative process steps can be used in other embodiments, and the ordering of these and other process steps can be altered relative to that shown above, possibly with one or more of the steps being performed at least in part in parallel with one or more other ones of the steps.

As yet another example, in other embodiments, certain files associated with the source VM can be proactively migrated to a target VM in certain migration contexts. This can include files that are not locked by a virtual machine file system or the corresponding hypervisor. Segregation of files of a source VM into movable and non-movable files can occur while the source VM is "live" or "hot." The moveable files can then be proactively moved while the source VM is still "live" or "hot." Such an arrangement can further shorten the time required for a subsequent cold migration of the source VM to the target VM. Numerous other arrangements are possible using the techniques disclosed herein.

The illustrative embodiments disclosed herein can provide a number of significant advantages relative to conventional arrangements. For example, some embodiments are configured to facilitate cold migration of virtual machines in a manner that advantageously preserves virtual machine integrity across shared assets while also providing significantly reduced virtual machine downtime.

These and other techniques for integrity-preserving cold migration of virtual machines in information processing systems as disclosed herein overcome various drawbacks of conventional cold migration techniques. For example, some embodiments can ensure migrated virtual machine integrity, with regard to shared assets of the virtual machine as well as other types of assets that may be used by the virtual machine in operation but are not readily apparent at the time of the migration. Such embodiments also avoid the need for manual intervention and the excessive downtime and other costs typically associated therewith.

Moreover, illustrative embodiments disclosed herein do not require that all of the virtual machine assets are in shared storage of a single management domain, and are therefore applicable to a wide variety of use cases.

Some embodiments involve incorporating additional metadata, such as file-in-use metadata, moveable file metadata and shared assets metadata, into virtual machine metadata files in order to facilitate cold migration of those virtual machines from a source domain to a target domain.

This additional metadata when utilized in a cold migration process of the type disclosed herein can ensure the integrity of the migrated virtual machines, while also providing highly efficient migration with minimal downtime. For example, illustrative embodiments are advantageously configured to ensure that shared assets are not unnecessarily duplicated in conjunction with migration of multiple virtual machines, even if those virtual machines are migrated at different times.

FIG. 5 illustrates example cold migration scenarios in one embodiment, showing the above-noted substantial downtime reduction relative to conventional arrangements. More particularly, this figure shows a table for different migration jobs performed using particular techniques, some "with solution" and others "without solution," where these and other references to a "solution" refer to an integrity-preserving cold migration process of the type disclosed herein, illustratively an example process of the type described above in conjunction with the flow diagram of FIG. 2.

In the first row of the table, a source VM with 1080 GigaBytes (GB) of data, but no shared assets, is migrated to a target domain using a conventional method, resulting in a substantial VM downtime on the order of 1 hour.

In the second row of the table, the source VM with 1080 GB of data also includes shared assets of total size 300 GB. Again, the conventional method is used, in which the shared assets are not copied, resulting in a substantial VM downtime on the order of 1 hour.

The third row of the table illustrates an arrangement in which a solution of the type disclosed herein is used to migrate the source VM. Here, it is assumed that there are no shared assets, but 360 GB of the 1080 GB are files-in-use, and the remaining 720 GB of the 1080 GB are movable files, with the particular method listed in the figure resulting in a substantially reduced downtime on the order of 20 minutes.

The fourth row of the table similarly illustrates an arrangement in which a solution of the type disclosed herein is used to migrate the source VM, but this time assuming that the source VM includes 300 GB of shared assets. In this case, the 360 GB of files-in-use are migrated in parallel with the 300 GB of shared assets, and then the 720 GB of moveable files are migrated while the target VM is starting up, again resulting in a substantially reduced downtime on the order of 20 minutes.

The particular "solutions" illustrated in FIG. 5 should not be construed as limiting in any way, as the corresponding cold migration methods are provided simply to show performance advantages of illustrative embodiments.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for integrity-preserving cold migration of virtual machines will now be described in greater detail with reference to FIGS. 6 and 7. Although described in the context of system 100, these platforms may also be used to implement at least portions of other information processing systems in other embodiments.

Figure 6:
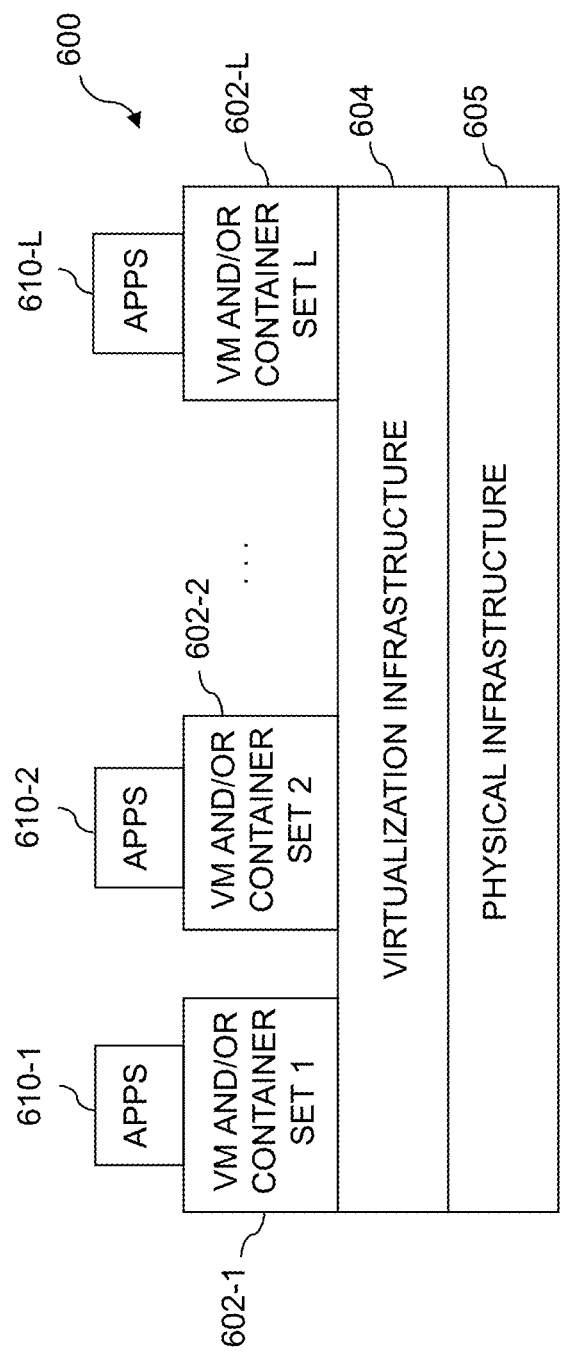
FIGS. 6 and 7 show examples of processing platforms that may be utilized to implement at least a portion of an information processing system in illustrative embodiments.
Figure 7:
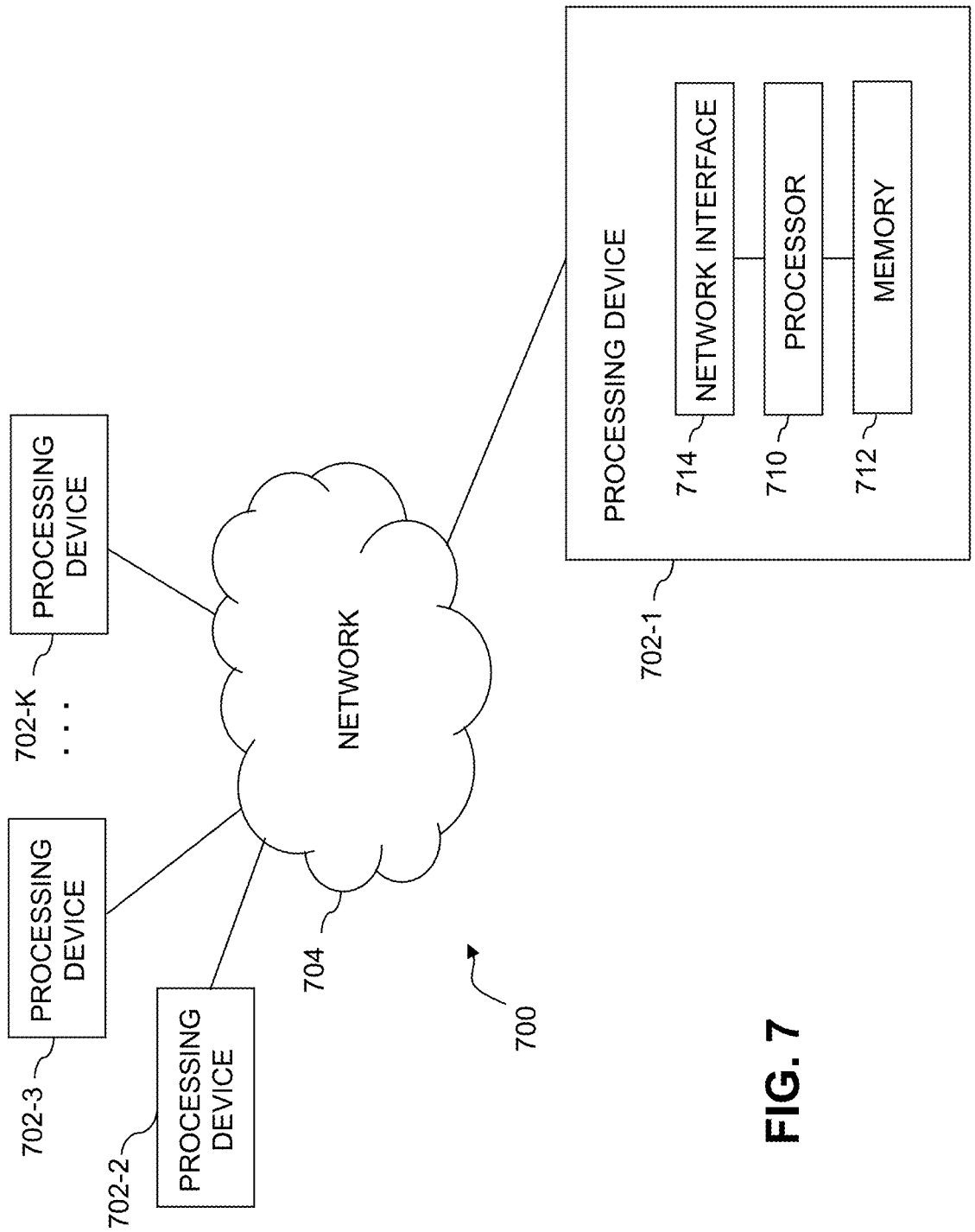

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for integrity-preserving cold migration of VMs in information processing system 100. For example, one or more of the VMs can be migrated from a source to a target domain under the control of at least one hypervisor of the virtualization infrastructure 604 in the manner described herein.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for integrity-preserving cold migration of VMs in information processing system 100. For example, one or more of the VMs that run Docker containers can be migrated from a source to a target domain under the control of the virtualization infrastructure 604 in the manner described herein.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for integrity-preserving cold migration of virtual machines as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing platforms, processing devices, virtualization infrastructure, hypervisors, virtual machines, migration control logic, metadata and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices each comprising a processor coupled to a memory;
said at least one processing platform being configured:
to identify a source virtual machine to be migrated from a source domain to a target domain;
to extract file-in-use metadata and shared asset metadata from virtual machine metadata of the source virtual machine;
to copy one or more files identified in the file-in-use metadata to a target virtual machine in the target domain; and
for each of one or more shared assets identified in the shared asset metadata, exclusive of the one or more files identified in the file-in-use metadata:
(a) to determine whether or not the shared asset already exists in the target domain;
(b) responsive to the shared asset already existing in the target domain, to update virtual machine metadata of the target virtual machine to specify the shared asset; and
(c) responsive to the shared asset not already existing in the target domain, to copy the shared asset to the target domain and to update virtual machine metadata of the target virtual machine to specify the shared asset;
wherein the processing platform is further configured:
to extract movable file metadata from the virtual machine metadata of the source virtual machine; and
to copy one or more files identified in the movable file metadata to the target virtual machine in the target domain;
wherein the copying of the one or more files identified in the movable file metadata to the target virtual machine in the target domain is performed after the target virtual machine is started in the target domain.

2. The apparatus of claim 1 wherein the source domain and the target domain are both part of a single processing platform.

3. The apparatus of claim 1 wherein the source domain is part of a first processing platform and the target domain is part of a second processing platform separate from the first processing platform.

4. The apparatus of claim 3 wherein the first and second processing platforms that include the respective source and target domains comprise respective first and second data centers.

5. The apparatus of claim 1 wherein in conjunction with successful completion of the copying of each of the one or more files identified in the file-in-use metadata to the target virtual machine in the target domain, a completion extension is added to the successfully copied file in the source domain.

6. The apparatus of claim 1 wherein the file-in-use metadata comprises a list of files in the source virtual machine that are required for operation of the source virtual machine.

7. The apparatus of claim 1 wherein in conjunction with successful completion of the copying of each of the one or more files identified in the movable file metadata to the target virtual machine in the target domain, a completion extension is added to the successfully copied file in the source domain.

8. The apparatus of claim 1 wherein the movable file metadata comprises a list of files in the source virtual machine that can be moved without impacting operation of the source virtual machine.

9. The apparatus of claim 1 wherein the one or more files identified in the movable file metadata comprise two or more of a suspended state file, a virtual machine snapshot file, a log file and a snapshot state file.

10. The apparatus of claim 1 wherein the one or more shared assets identified in the shared asset metadata comprise one or more assets each assigned to multiple virtual machines of the source domain.

11. The apparatus of claim 1 wherein the copying of one or more files identified in the file-in-use metadata and the copying of the shared asset to the target domain are performed at least in part in parallel with one another.

12. The apparatus of claim 1 wherein for each of the one or more shared assets identified in the shared asset metadata, an asset migration metadata file is updated in the target domain to include that shared asset.

13. The apparatus of claim 1 wherein determining whether or not the shared asset already exists in the target domain comprises:
accessing an asset migration metadata file maintained in the target domain; and
determining whether or not the shared asset is identified in the asset migration metadata file.

14. A method comprising:
identifying a source virtual machine to be migrated from a source domain to a target domain;
extracting file-in-use metadata and shared asset metadata from virtual machine metadata of the source virtual machine;
copying one or more files identified in the file-in-use metadata to a target virtual machine in the target domain; and
for each of one or more shared assets identified in the shared asset metadata, exclusive of the one or more files identified in the file-in-use metadata:
(a) determining whether or not the shared asset already exists in the target domain;
(b) responsive to the shared asset already existing in the target domain, updating virtual machine metadata of the target virtual machine to specify the shared asset; and
(c) responsive to the shared asset not already existing in the target domain, copying the shared asset to the target domain and updating virtual machine metadata of the target virtual machine to specify the shared asset;
wherein the method further comprises:
extracting movable file metadata from the virtual machine metadata of the source virtual machine; and
copying one or more files identified in the movable file metadata to the target virtual machine in the target domain;
wherein the copying of the one or more files identified in the movable file metadata to the target virtual machine in the target domain is performed after the target virtual machine is started in the target domain; and
wherein the method is performed by a processing platform comprising a plurality of processing devices each comprising a processor coupled to a memory.

15. The method of claim 14 wherein for each of the one or more shared assets identified in the shared asset metadata, an asset migration metadata file is updated in the target domain to include that shared asset.

16. The method of claim 14 wherein determining whether or not the shared asset already exists in the target domain comprises:
accessing an asset migration metadata file maintained in the target domain; and determining whether or not the shared asset is identified in the asset migration metadata file.

17. A computer program product comprising a non-transitory processor-readable storage medium having stored therein program code of one or more software programs, wherein the program code, when executed by at least one processing platform comprising a plurality of processing devices each comprising a processor coupled to a memory, causes said at least one processing platform:

to identify a source virtual machine to be migrated from a source domain to a target domain;

to extract file-in-use metadata and shared asset metadata from virtual machine metadata of the source virtual machine;

to copy one or more files identified in the file-in-use metadata to a target virtual machine in the target domain; and for each of one or more shared assets identified in the shared asset metadata, exclusive of the one or more files identified in the file-in-use metadata:

(a) to determine whether or not the shared asset already exists in the target domain;

(b) responsive to the shared asset already existing in the target domain, to update virtual machine metadata of the target virtual machine to specify the shared asset; and (c) responsive to the shared asset not already existing in the target domain, to copy the shared asset to the target domain and to update virtual machine metadata of the target virtual machine to specify the shared asset;

wherein the program code, when executed by said at least one processing platform, further causes said at least one processing platform:

to extract movable file metadata from the virtual machine metadata of the source virtual machine; and to copy one or more files identified in the movable file metadata to the target virtual machine in the target domain;

wherein the copying of the one or more files identified in the movable file metadata to the target virtual machine in the target domain is performed after the target virtual machine is started in the target domain.

18. The computer program product of claim 17 wherein for each of the one or more shared assets identified in the shared asset metadata, an asset migration metadata file is updated in the target domain to include that shared asset.

19. The computer program product of claim 17 wherein determining whether or not the shared asset already exists in the target domain comprises:

accessing an asset migration metadata file maintained in the target domain; and determining whether or not the shared asset is identified in the asset migration metadata file.

20. The computer program product of claim 17 wherein in conjunction with successful completion of the copying of each of the one or more files identified in the file-in-use metadata to the target virtual machine in the target domain, a completion extension is added to the successfully copied file in the source domain.

* * * * *